(12) United States Patent
Fujii et al.

(10) Patent No.: US 11,579,488 B2
(45) Date of Patent: Feb. 14, 2023

(54) LIGHT FLUX CONTROLLING MEMBER, LIGHT EMITTING DEVICE, SURFACE LIGHT SOURCE DEVICE, DISPLAY DEVICE, AND METHOD FOR IMPROVING LUMINANCE UNEVENNESS OF LIGHT EMITTING DEVICE

(71) Applicant: Enplas Corporation, Saitama (JP)

(72) Inventors: Yuki Fujii, Saitama (JP); Takao Miyoshi, Saitama (JP); Hiroshi Takatori, Saitama (JP); Takuro Momoi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/371,550

(22) Filed: Jul. 9, 2021

(65) Prior Publication Data
US 2022/0011633 A1 Jan. 13, 2022

(30) Foreign Application Priority Data

Jul. 13, 2020 (JP) .............................. JP2020-120043
Nov. 20, 2020 (JP) .............................. JP2020-193525

(51) Int. Cl.
*G02F 1/13357* (2006.01)
*G02F 1/1335* (2006.01)

(52) U.S. Cl.
CPC ................ *G02F 1/133607* (2021.01); *G02F 1/133611* (2013.01)

(58) Field of Classification Search
CPC .............. F21V 5/07; F21V 7/041; F21V 7/09; F21V 7/0083; G02F 1/133607; G02F 1/133611
See application file for complete search history.

(56) References Cited

U.S. PATENT DOCUMENTS 9,806,242 B2 * 10/2017 Chiu ........................ H01L 33/58
9,890,921 B2 * 2/2018 Park ................... G02F 1/133603

FOREIGN PATENT DOCUMENTS

CN 110208984 A 9/2019

* cited by examiner

*Primary Examiner* — Julie A Bannan
(74) *Attorney, Agent, or Firm* — Brundidge & Stanger, P.C.

(57) ABSTRACT

A light flux controlling member includes n incidence units for allowing incidence of light emitted from n light emitting elements, respectively; an emission unit disposed between the n incidence units and allowing emission of the light incident on the n incidence units while guiding the light; and a plurality of legs. Each incidence unit includes an incidence surface and a reflection surface reflecting, in a direction along the substrate, the light incident on the incidence surface. The emission unit includes a first emission surface emitting a part of the light from the incidence unit, and a second emission surface disposed so as to face away from the first emission surface and emitting another part of the light from the incidence unit. Each leg is disposed at a position satisfying a predetermined condition.

5 Claims, 17 Drawing Sheets

LIGHT FLUX CONTROLLING MEMBER, LIGHT EMITTING DEVICE, SURFACE LIGHT SOURCE DEVICE, DISPLAY DEVICE, AND METHOD FOR IMPROVING LUMINANCE UNEVENNESS OF LIGHT EMITTING DEVICE

CROSS REFERENCE TO RELATED APPLICATIONS

This application is entitled to the benefit of Japanese Patent Application No. 2020-193525, filed on Nov. 20, 2020 and Japanese Patent Application No. 2020-120043, filed on Jul. 13, 2020, the disclosures of which including the specifications, drawings and abstracts are incorporated herein by reference in their entirety.

TECHNICAL FIELD

The present invention relates to a light flux controlling member for controlling a distribution of light emitted from a light emitting element, a light emitting device including the light flux controlling member, a surface light source device including the light emitting device, a display device including the surface light source device, and a method for improving luminance unevenness of the light emitting device.

BACKGROUND ART

In recent years, a direct surface light source device including a plurality of light emitting elements as a light source is used in transmission image display devices such as liquid crystal displays. A large number of light emitting elements may be disposed to illuminate a wide range with light.

Patent Literature (hereinafter, referred to as PTL) 1 discloses a light flux controlling member (microarray lens) suitable for being disposed over a large number of light emitting elements. A large number of lenses are connected by a support plate in these microarray lenses, and one microarray lens is disposed above a large number of light emitting elements (mini LEDs) disposed on a substrate. This configuration eliminates the necessity to dispose lenses individually above corresponding light emitting elements, and enhances the handling property at the time of mounting to facilitate the mounting.

CITATION LIST

Patent Literature

PTL 1
Chinese Patent Application Publication No. 110208984

SUMMARY OF INVENTION

Technical Problem

The above-described light flux controlling member (microarray lens) has a suitable handling property at the time of mounting, however, the light flux controlling member may become thick when the light flux controlling member is used for controlling distribution of light emitted from a light emitting element as desired. As a result, the surface light source device may also become thick.

An object of the present invention is to provide a light flux controlling member that can appropriately distribute light from a plurality of light emitting elements while the handling property of the light flux controlling member at the time of mounting is enhanced by disposing the one light flux controlling member above the plurality of light emitting elements. Another object of the present invention is to provide a light emitting device, a surface light source device, and a display device which include the light flux controlling member. Yet another object of the present invention is to provide a method for improving the luminance unevenness of the above-described light emitting device.

Solution to Problem

A light flux controlling member of the present invention is for controlling a distribution of light emitted from n light emitting elements disposed on a substrate, the light flux controlling member comprising: n incidence units for allowing incidence of light emitted from the n light emitting elements, respectively; an emission unit disposed between the n incidence units in a direction along the substrate, the emission unit allowing emission of the light incident on the n incidence units while guiding the light; and a plurality of legs disposed on a back side of the light flux controlling member, the plurality of legs supporting the light flux controlling member with respect to the substrate; in which each of the n incidence units includes: an incidence surface disposed on the back side of the light flux controlling member, the incidence surface allowing incidence of the light emitted from the light emitting element; and a reflection surface disposed on a front side of the light flux controlling member at a position facing the light emitting element with the incidence surface interposed between the reflection surface and the light emitting element, the reflection surface reflecting, in a lateral direction, the light incident on the incidence surface in such a way that the reflected light travels away from an optical axis of the light emitting element, in which the emission unit includes: a first emission surface disposed on the front side of the light flux controlling member, the first emission surface reflecting a first part of the light from the incidence unit and emitting a second part of the light from the incidence unit, and a second emission surface disposed on the back side of the light flux controlling member so as to face away from the first emission surface, the second emission surface reflecting a third part of the light from the incidence unit and emitting a fourth part of the light from the incidence unit; and in which each of the plurality of legs is disposed at a position satisfying condition 1 or 2 below condition 1:
with the light flux controlling member in plan view, at least a part of the leg is disposed outside a first region surrounded by 2n straight lines obtained by drawing two straight lines from a center of each of the n incidence units, the two straight lines being at respective angles of $+(60/n)°$ and $-(60/n)°$ with respect to a center of gravity of a polygonal formed by connecting the respective centers of the n incident units, condition 2:
all of the leg is disposed inside a second region where light defined by a) to c) below substantially does not reach, the light defined by a) to c) being of light emitted from a light emitting center and incident on the incident surface, and being as follows: a) light that is reflected by no surface except for the reflection surface after reaching the reflection surface directly from the incidence surface and being reflected by the reflection surface, b) light that is reflected by no surface except for the reflection surface or the first emission surface after reaching the reflection surface directly from the incidence surface and being sequentially reflected by the reflection surface and the first emission surface, and c) light that is reflected by no surface except for the first emission surface after reaching the first emission surface directly from the incidence surface and being reflected by the first emission surface, the light emitting center being an intersection at a light emitting surface of the light emitting element with a central axis of the incidence unit.

A light emitting device of the present invention includes n light emitting elements disposed on a substrate, and the above-described light flux controlling member disposed above the n light emitting elements.

In the light emitting device, the plurality of legs are preferably bonded to the substrate by using an adhesive having a color whose optical absorption is less than that of black.

A surface light source device of the present invention includes a plurality of the above-described light emitting devices and a light diffusion plate that transmits light emitted from the plurality of light emitting devices while diffusing the light.

A display device of the present invention includes the above-described surface light source device and a display member to be illuminated by light emitted from the surface light source device.

A method of the present invention for improving luminance unevenness of the light emitting device is a method for improving luminance unevenness of the above-described light emitting device, in which the plurality of legs of the above-described light flux controlling member are fixed to the substrate by using an adhesive having an optical absorption rate selected according to the luminance distribution.

Advantageous Effects of Invention

The present invention can provide a light flux controlling member that can appropriately distribute light from a plurality of light emitting elements while the handling property of the light flux controlling member at the time of mounting is enhanced by disposing the one light flux controlling member above the plurality of light emitting elements. The present invention can also provide a light emitting device, a surface light source device, and a display device which include the above-described light flux controlling member.

DESCRIPTION OF EMBODIMENTS

Hereinafter, one or more embodiments of the present invention will be described in detail with reference to the drawings. In the following description, a surface light source device suitable for a backlight of a liquid crystal display device or the like will be described as a typical example of the surface light source device according to the present invention. Such a surface light source device can be used as display device 100' in combination with display member 102 (such as a liquid crystal panel) which is to be illuminated by light from the surface light source device (see FIG. 1B).

Configurations of Surface Light Source Device and Light Emitting Device

Figure 1A:
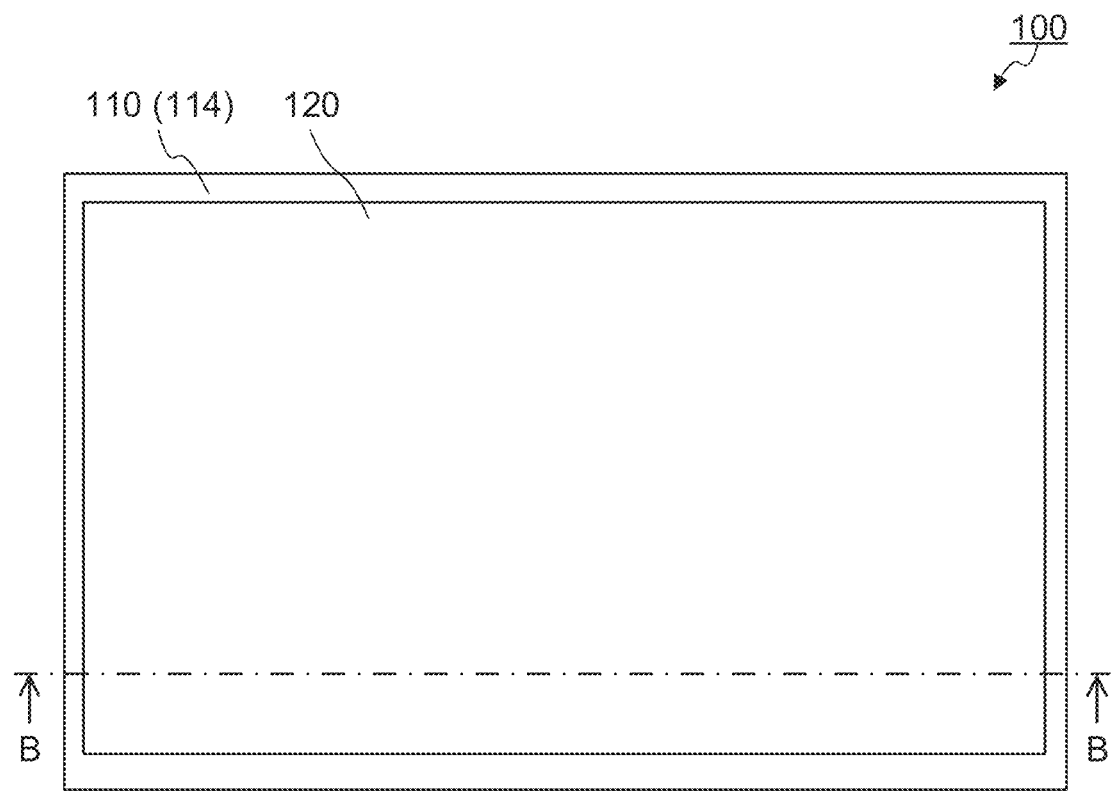
FIGS. 1A and 1B illustrate a configuration of a surface light source device according to an embodiment.
Figure 1B:
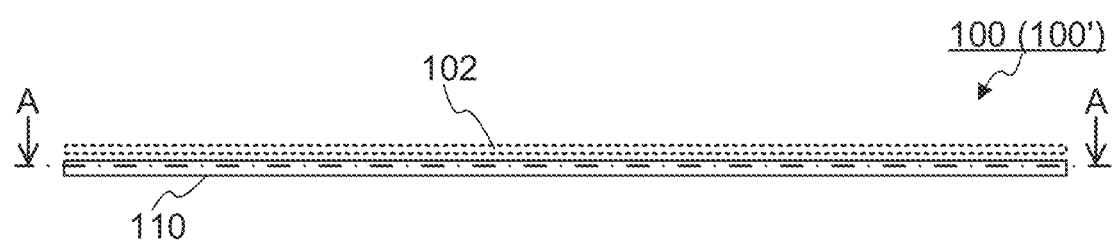
Figure 2A:
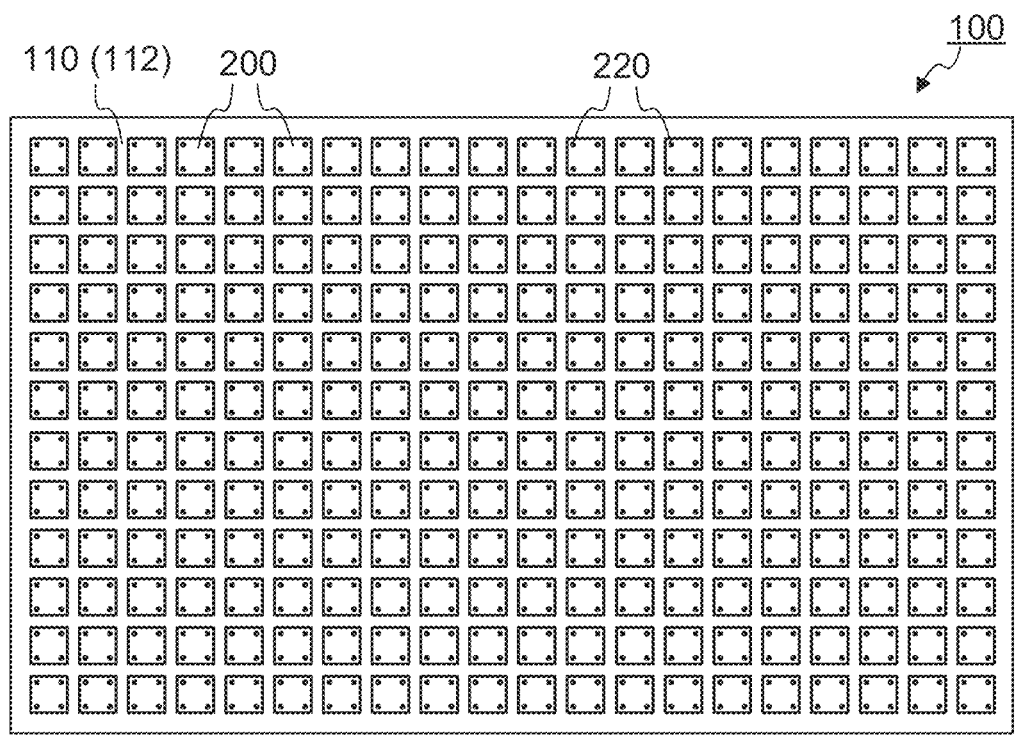
FIGS. 2A to 2C illustrate the configuration of the surface light source device according to the embodiment.
Figure 2B:
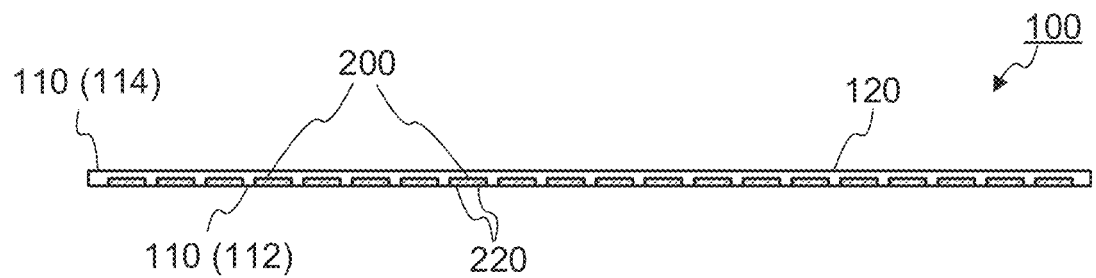
Figure 2C:
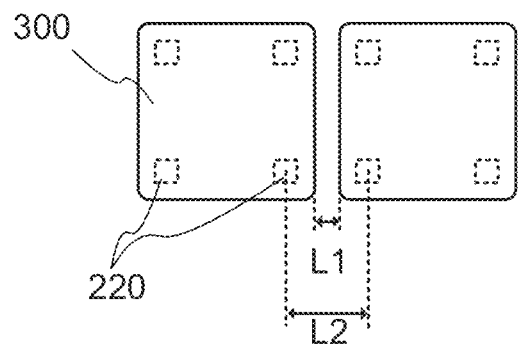
Figure 3:
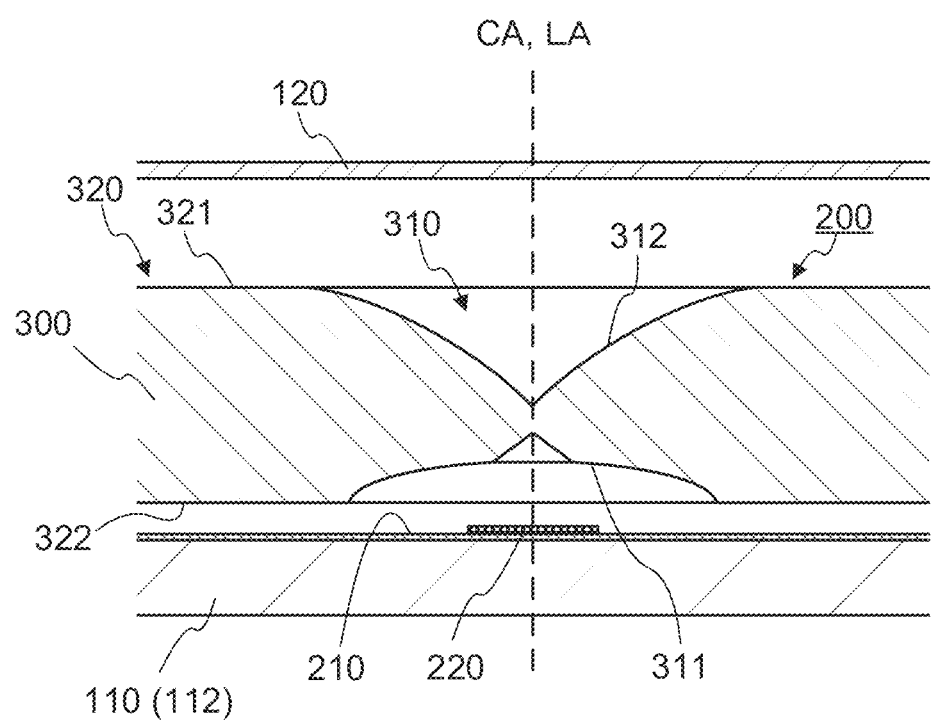
FIG. 3 is a partially enlarged view of FIG. 2B.

FIGS. 1A and 1B illustrate a configuration of surface light source device 100 according to an embodiment of the present invention. FIG. 1A is a plan view, and FIG. 1B is a front view. FIG. 2A is a cross-sectional view taken along line A-A of FIG. 1B, and FIG. 2B is a cross-sectional view taken along line B-B of FIG. 1A. FIG. 2C is a partially enlarged plan view showing the positional relationship between light emitting element 220 and light flux controlling member 300. FIG. 3 is a partially enlarged cross-sectional view illustrating an enlarged part of FIG. 2B.

As illustrated in FIGS. 1A to 3, surface light source device 100 according to the present embodiment includes casing 110, a plurality of light emitting devices 200, and light diffusion plate 120. The plurality of light emitting device 200 are disposed in a grid pattern (in a matrix) on bottom plate 112 of casing 110. The inner surface of bottom plate 112 functions as a diffusive reflection surface. Top plate 114 of casing 110 is provided with an opening. Light diffusion plate 120 is disposed to close the opening, and functions as a light emitting surface. The light emitting surface may have any size which is, for example, about 400 mm×about 700 mm.

As illustrated in FIG. 3, light emitting device 200 is fixed on substrate 210. Substrate 210 is fixed at a predetermined position on bottom plate 112 of casing 110. Each light emitting device 200 includes a plurality of light emitting elements 220 and light flux controlling member 300 (see also FIG. 2C).

Light emitting element 220 is a light source of surface light source device 100 and is mounted on substrate 210. Light emitting element 220 is a light emitting diode (LED), such as a white light emitting diode. Light emitting element 220 may be of any type, and light emitting element 220 that emits light from the top surface and side surface(s) (for example, COB type light emitting diode) is suitably used in light emitting device 200 according to the embodiment of the present invention.

The size of the light emitting surface of the light emitting element 220 is not limited, but it is preferably a small size from the viewpoint of appropriately distributing light and reducing color unevenness. Specifically, the size of the light emitting surface of light emitting element 220 is preferably 0.1 mm to 0.6 mm, more preferably 0.1 mm to 0.3 mm.

Light flux controlling member 300 is an optical member for controlling the distribution of light emitted from at least one light emitting element 220, and is fixed on substrate 210. As described below, light flux controlling member 300 includes a plurality of incidence units 310, and light flux controlling member 300 is disposed above a plurality of light emitting elements 220 in such a way that central axis CA of each incidence unit 310 (incidence surface 311) coincides with optical axis OA of corresponding light emitting element 220. In light flux controlling member 300 according to the present embodiment, incidence unit 310 (incidence surface 311 and reflection surface 312) of light flux controlling member 300 is rotationally symmetric. The rotation axis of incidence unit 310 is referred to as "central axis CA of incidence unit 310, incidence surface 311, or reflection surface 312." In addition, "optical axis OA of a light emitting element 220" means a central light beam of a stereoscopic emission light flux from light emitting element 220. The "light emitting center of light emitting element 220" means an intersection, at the light emitting surface of light emitting element 220, with central axis CA of incidence unit 310.

Light flux controlling member 300 includes a plurality of legs 330. A gap for releasing the heat generated from light emitting element 220 to the outside is formed between substrate 210 with light emitting element 220 mounted thereon and the back surface of light flux controlling member 300 (see, FIG. 3). Plurality of legs 330 of light flux controlling member 300 may be fixed to substrate 210 by an adhesive.

Any method may be used for fixing light flux controlling member 300 to substrate 210. For example, plurality of legs 330 of light flux controlling member 300 may be fixed to substrate 210 by using a black adhesive or an adhesive having a color whose optical absorption is less than that of black. In this case, when light emitting device 200 is viewed from above, leg 330 disposed in a region that tends to be a bright part is preferably fixed to substrate 210 by using a black adhesive or an adhesive having a color with high optical absorption. On the other hand, when light emitting device 200 is viewed from above, leg 330 disposed in a region that tends to be a dark part is preferably fixed to substrate 210 by using an adhesive having a color, such as white, with low optical absorption. When a colorless transparent adhesive is used, the color of the member to be adhered such as a substrate has a rather large effect, but selectively using a colored adhesive allows for obtainment of a light emitting device with less luminance unevenness. As described above, fixing plurality of legs 330 of light flux controlling member 300 to substrate 210 by using the adhesive having the optical absorption rate selected according to the luminance distribution can improve the luminance unevenness of light emitting device 200.

Light flux controlling member 300 is formed by integral molding. The material of light flux controlling member 300 may be any material that allows light with a desired wavelength to pass therethrough. The material of light flux controlling member 300 is, for example, polymethylmethacrylate (PMMA), polycarbonate (PC), an epoxy resin (EP) or an silicone resin, or glass.

Surface light source device 100 according to the present embodiment has its main feature in the configuration of light flux controlling member 300. Light flux controlling member 300 will thus be separately described below in detail.

Light diffusion plate 120 is a plate-shaped member having a light diffusing property, and transmits light emitted from light emitting device 200 while diffusing the light. Normally, the size of light diffusion plate 120 is substantially the same as that of the display member such as a liquid crystal panel. Light diffusion plate 120 is formed of, for example, an optically transparent resin such as polymethylmethacrylate (PMMA), polycarbonate (PC), polystyrene (PS), or styrene-methylmethacrylate copolymer resin (MS). In order to provide a light diffusing property, minute irregularities are formed in the surface of light diffusion plate 120, or light diffusing members such as beads are dispersed inside light diffusion plate 120.

In surface light source device 100 according to the present embodiment, light emitted from each light emitting element 220 is expanded by light flux controlling member 300 so as to illuminate a wide range of light diffusion plate 120. The light emitted from each light flux controlling member 300 is further diffused by light diffusion plate 120. Surface light source device 100 according to the present embodiment can thus uniformly illuminate planar display member 102 (for example, a liquid crystal panel). When a bright part or a dark part is generated on the light emitting surface (light diffusion plate 120), the degree of light absorption and reflection in an adhesive to be used may be adjusted to eliminate the generated bright or dark part by adjusting the color of the adhesive according to the position and degree of the bright or dark part.

As illustrated in FIGS. 2A and 2C, plurality of light emitting elements 220 are disposed in a grid pattern and separated from each other, and plurality of light emitting devices 200 are also disposed in a grid pattern and separated from each other in the present embodiment. Distance L1 between adjacent light emitting devices 200 may be smaller than half of center-to-center distance L2 of plurality of light emitting elements 220. Herein, "center-to-center distance L2 of plurality of light emitting elements 220" means the center-to-center distance of two light emitting elements 220 belonging to different light emitting devices 200. This configuration allows light flux controlling member 300 to guide light to a wide range, thereby preventing the space between light emitting devices 200 from becoming dark.

It is also important that there is a gap between adjacent light emitting devices 200 and that light emitting devices 200 are disposed so as not to be in contact with each other. If light emitting devices 200 are not disposed with a gap therebetween, the light emitted from the end of light flux controlling member 300 may enter or be reflected at the end of adjacent light flux controlling member 300. This may adversely affect the light emission quality of light diffusion plate 120.

Configuration of Light Flux Controlling Member

Figure 4:
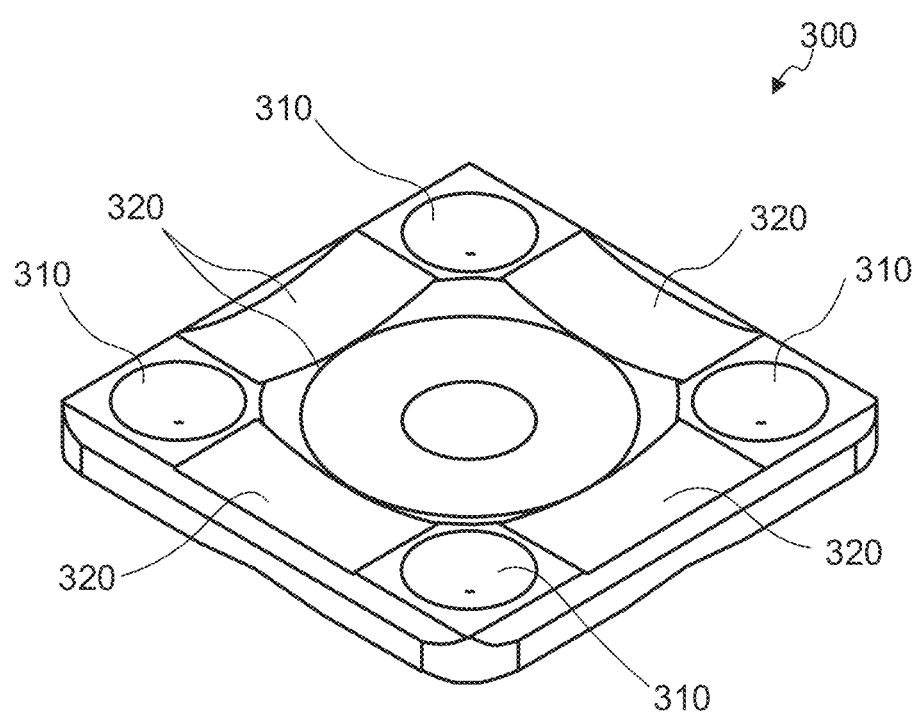
FIG. 4 is a perspective view illustrating a configuration of a light flux controlling member according to the embodiment.
Figure 5A:
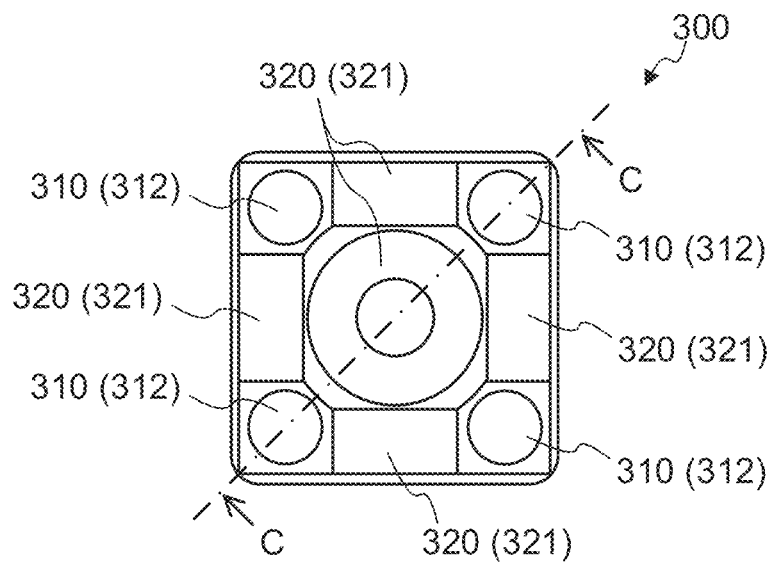
FIGS. 5A to 5C illustrate the configuration of the light flux controlling member according to the embodiment.
Figure 5B:
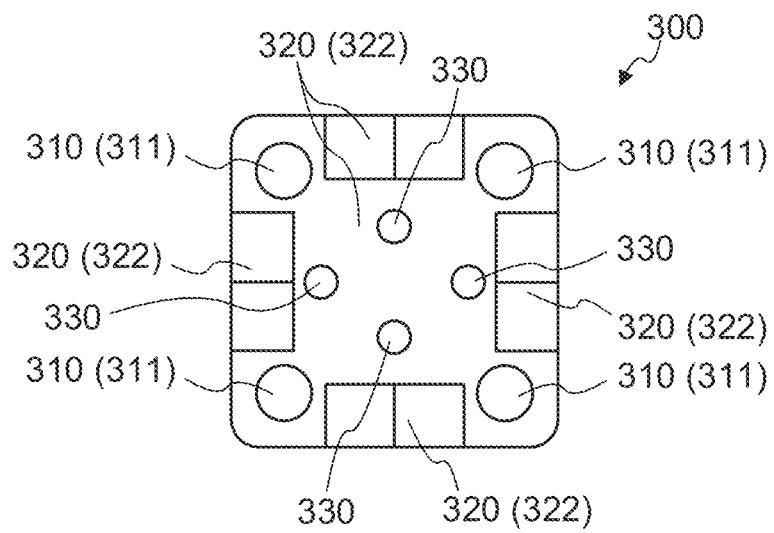
Figure 5C:
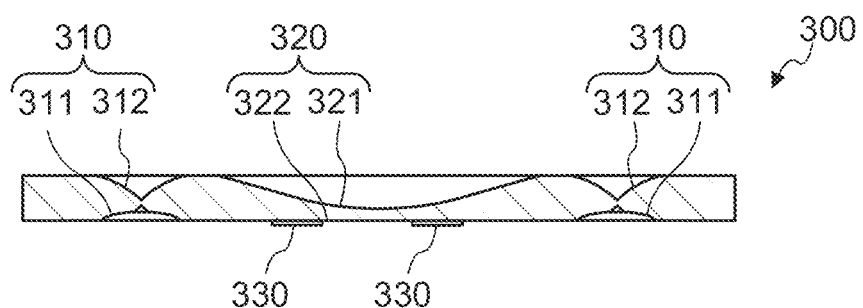

FIG. 4 is a perspective view of light flux controlling member 300 according to the embodiment. FIG. 5A is a plan view of light flux controlling member 300 according to the embodiment, FIG. 5B is a bottom view of light flux controlling member 300, and FIG. 5C is a cross-sectional view taken along line C-C of FIG. 5A. FIG. 5C illustrates light flux controlling member 300 in an enlarged manner as compared with FIGS. 5A and 5B. Hereinafter, the configuration of light flux controlling member 300 will be described.

Light flux controlling member 300 is for controlling the distribution of light emitted from n light emitting elements 220 disposed on substrate 210. Light flux controlling member 300 includes n incidence units 310, one or more emission units 320, and plurality of legs 330. In the present embodiment, light flux controlling member 300 includes four incidence units 310 for controlling the distribution of light emitted from four light emitting elements 220. The n (four) incidence units 310 are disposed in a grid pattern corresponding to the arrangement of light emitting elements 220. Emission units 320 are disposed between n (four) incidence units 310 in the direction along substrate 210. Plurality of legs 330 are disposed on the back side of light flux controlling member 300. In the present embodiment, light flux controlling member 300 includes four legs 330 (see FIG. 5B). Herein "n" is an integer greater than 0.

Each incidence unit 310 allows incidence of light emitted from light emitting element 220. Incidence unit 310 includes incidence surface 311 that allows incidence of light emitted from light emitting element 220 and reflection surface 312 that reflects the light incident on incidence surface 311 toward emission unit 320.

Incidence surface 311 is an inner surface of a recess disposed on the back side of light flux controlling member 300 and formed at a position facing light emitting element 220. Incidence surface 311 allows the majority of light emitted from light emitting element 220 to enter light flux controlling member 300, while controlling the travelling direction of the light. Incidence surface 311 intersects with optical axis OA of light emitting element 220 and is rotationally symmetric (circular symmetry) about optical axis OA. Incidence surface 311 may have any shape, and is set in such a way that the light incident on incidence surface 311 is directed toward reflection surface 312 and first emission surface 321. In the present embodiment, the recess forming incidence surface 311 has a shape in which a small deep recess is disposed in the central portion of a large shallow recess (see FIG. 3). The small recess in the central portion has a shape such that the distance of the small recess from substrate 210 gradually decreases as the distance of the recess from optical axis OA of light emitting element 220 increases. The part of incidence surface 311 formed by this small recesses controls the light from light emitting element 220 in such a way that light emitted from light emitting element 220 at a small angle with respect to optical axis OA is also directed toward a region except for the central portion of reflection surface 312. The large recess located around the small recess has a shape such that the distance of the large recess from substrate 210 is substantially constant for a while and then gradually decreases as the distance of the large recess from optical axis OA of light emitting element 220 increases. The part of incidence surface 311 formed by this large recess controls the light from light emitting element 220 in such a way that light emitted from light emitting element 220 at a large angle with respect to optical axis OA is directed toward first emission surface 321.

Reflection surface 312 is disposed on the front side of light flux controlling member 300 at a position facing light emitting element 220 with incidence surface 311 interposed therebetween. Reflection surface 312 reflects the light incident on incidence surface 311 in the lateral direction in such a way that the reflected light travels away from optical axis OA of light emitting element 220. Herein, the lateral direction does not mean only a direction toward the outer edge of light flux controlling member 300, but means every radial direction (direction perpendicular to optical axis OA) about optical axis OA. Reflection surface 312 thus reflects the light incident on incidence surface 311 also toward the central portion of light flux controlling member 300 (see FIG. 6). Reflection surface 312 thus can prevent light incident on incidence surface 311 from escaping upward, thereby preventing the generation of a bright part directly above light emitting element 220, and can also guide the light between light emitting elements 220, thereby preventing the generation of a dark part between light emitting elements 220.

Reflection surface 312 may have any shape as long as the light incident on incidence surface 311 is laterally reflected. Reflection surface 312 may be configured, for example, to be rotationally symmetric (circularly symmetric) about optical axis OA of light emitting element 220, and to approach the front side (away from substrate 210) as the distance of the surface from optical axis OA of light emitting element 220 increases. The generatrix from the central portion to the outer peripheral portion of this rotationally symmetric surface is a curved line or a straight line inclined with respect to optical axis of light emitting element 220. In the present embodiment, the generatrix is a curve in which the angle with respect to optical axis OA increases as the distance of the generatrix from optical axis OA of light emitting element 220 increases. Reflection surface 312 is a concave surface in a state where the generatrix is rotated by 360° with central axis CA of incidence surface 311 as a rotation axis.

Reflection surface 312 may have a plurality of protrusions disposed so as to connect the central portion and the outer edge of reflection surface 312. Each protrusion includes a first inclined surface, a second inclined surface disposed in pairs with the first inclined surface, and a ridge line, which is a boundary line between the first inclined surface and the second inclined surface. The plurality of protrusions are disposed so that a valley is formed between two adjacent protrusions. Reflection surface 312 including such protrusions thus can further reflect light incident on incidence surface 311, thereby preventing the light from escaping upward.

In the present embodiment, incidence surface 311 and reflection surface 312 are configured in such a way that a part of light emitted from the light emitting center of light emitting element 220 reaches second emission surface 322 of emission unit 320 after the light is incident on incidence surface 311 and reflected by reflection surface 312.

In plan view, the area of the opening edge of the recess forming reflection surface 312 is preferably 0.5 to 2.0 times, more preferably 0.5 to 1.5 times, and particularly preferably 0.5 to 1.3 times, the area of the opening edge of the recess forming incidence surface 311. That is, the size of reflection surface 312 with respect to incidence surface 311 is smaller than that of the conventional total reflection lens. This configuration is employed because the light emitted from the light emitting center of light emitting element 220 and incident on incidence surface 311 is designed to reach not only reflection surface 312 but also first emission surface 321 in the present embodiment.

Emission unit 320 emits light incident on each incidence unit 310 while guiding the light. In the present embodiment, when four incidence units 310 are assumed to be disposed at individual vertices of a virtual rectangle (square), light flux controlling member 300 includes four emission units 320 disposed at positions corresponding to the four sides of the virtual rectangle in such a way that each emission unit is disposed along the corresponding side, and also one emission unit 320 disposed so as to be surrounded by the virtual rectangle. Each emission unit 320 includes first emission surface 321 disposed on the front side of light flux controlling member 300. First emission surface 321 reflects a part of light from incidence unit 310 and emits another part of the light. Each emission unit 320 also includes second emission surface 322 disposed on the back side of light flux controlling member 300 so as to face away from first emission surface 321. Second emission surface 322 reflects a part of the light from incidence unit 310 and emits another part of the light.

Emission unit 320 preferably include an emission promotion part for promoting the emission of light traveling between first emission surface 321 and second emission surface 322. The emission promotion part is preferably disposed on at least one of first emission surface 321 and second emission surface 322. In the present embodiment, the emission promotion part is disposed on first emission surface 321 and second emission surface 322, such that the distance between first emission surface 321 and second emission surface 322 decreases as the distance of the surfaces from incidence unit 310 increases. Such a configuration allows the light guided from incidence unit 310 to be emitted more readily from first emission surface 321 as the distance of the light from incidence unit 310 increases.

First emission surface 321 and second emission surface 322 may have any shape. In the present embodiment, four first emission surfaces 321 individually disposed at positions corresponding to the four sides of the virtual rectangle are each a concave surface having a curvature in the direction along the corresponding side of the virtual rectangle and no curvature in the direction perpendicular to this side (see FIG. 4). Four second emission surfaces 322 individually disposed at positions corresponding to the four sides of the virtual rectangle are each a concave surface formed of two inclined flat surfaces each approaching the front side as the distance of the flat surface from incidence unit 310 on either side increases. First emission surface 321 of emission unit 320 disposed so as to be surrounded by the virtual rectangle is a concave surface formed by the upper bottom and a part of the side surface of a truncated cone disposed upside down, and second emission surface 322 of this emission unit is a flat surface (see FIGS. 5A and 5C).

The emission promotion part may have any configuration that can exhibit the above-described functions. For example, the emission promotion part may be disposed on at least one of first emission surface 321 and second emission surface 322, and may be at least one selected from the group consisting of concave surfaces, rough surfaces, fresnel surfaces, grooves, and through holes.

When the emission promotion part is a concave surface formed on first emission surface 321 or second emission surface 322, the distance between first emission surface 321 and second emission surface 322 decreases as the distance of the surfaces from incidence unit 310 increases. This configuration thus promotes emission of light traveling between first emission surface 321 and second emission surface 322 from first emission surface 321 and second emission surface 322. When the emission promotion part is a rough surface formed on second emission surface 322, light traveling between first emission surface 321 and second emission surface 322 is irregularly reflected by the rough surface rather than specularly reflected. This configuration thus promotes emission of the light from first emission surface 321. When the emission promotion part is a rough surface formed on first emission surface 321, light traveling between first emission surface 321 and second emission surface 322 is diffused while being transmitted through the rough surface rather than specularly reflected. This configuration thus promotes emission of the light from first emission surface 321. When the emission promotion part is a fresnel surface or a groove(s) formed on second emission surface 322, light traveling between first emission surface 321 and second emission surface 322 is reflected toward first emission surface 321 in such a way that the incident angle at first emission surface 321 becomes small in the fresnel surface or the surface forming the groove(s). This configuration thus promotes emission of the light from first emission surface 321. When the emission promotion part is a fresnel surface or a groove(s) formed on first emission surface 321, light traveling between first emission surface 321 and second emission surface 322 is emitted from the fresnel surface or the surface forming the groove(s). This configuration thus promotes emission of the light from first emission surface 321. When the emission promotion part is a through hole(s) open in first emission surface 321 and/or second emission surface 322, light traveling between first emission surface 321 and second emission surface 322 is emitted from the surface forming the through hole(s). This configuration thus promotes emission of the light from first emission surface 321.

Figure 6:
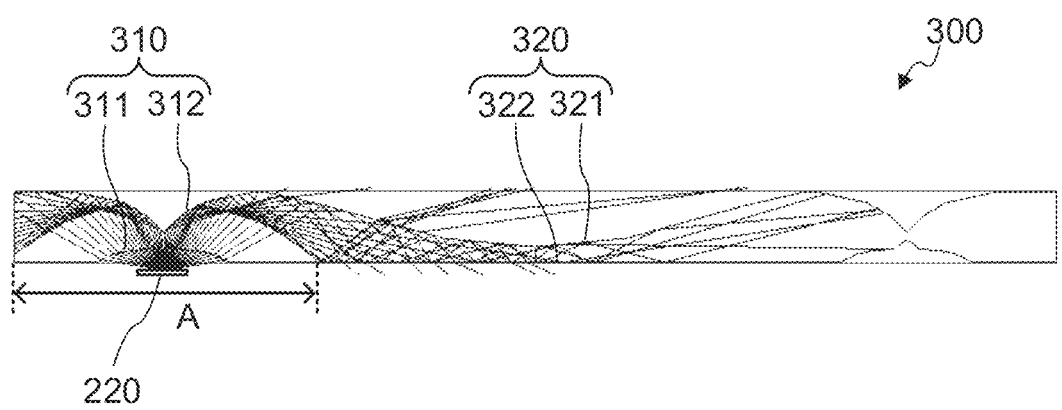
FIG. 6 illustrate optical paths in a light emitting device according to the embodiment.

FIG. 6 illustrate optical paths in light emitting device 200 on the cross section along line C-C of FIG. 5A. FIG. 6 illustrate the optical paths of light emitted from the light emitting center of one light emitting element 220. As illustrated in FIG. 6, the light emitted from light emitting element 220 enters light flux controlling member 300 from incidence surface 311. A part of the light incident on incidence surface 311 is directly directed to emission unit 320, and another part of the light is reflected by reflection surface 312 and directed to emission unit 320. The light reaching emission unit 320 is repeatedly reflected by first emission surface 321 and second emission surface 322, and is guided through emission unit 320. During the guidance, a part of the light reaching first emission surface 321 is emitted from first emission surface 321 without being reflected, and a part of the light reaching second emission surface 322 is emitted from second emission surface 322 without being reflected.

In this way, the light reaching emission unit 320 travels between first emission surface 321 and second emission surface 322 of emission unit 320, and is gradually emitted from first emission surface 321 and second emission surface 322. Emission unit 320 includes an emission promotion part in which the distance between first emission surface 321 and second emission surface 322 decreases as the distance of the surfaces from incidence unit 310 increases. Such a configuration allows the light traveling between first emission surface 321 and second emission surface 322 to be emitted more readily from first emission surface 321 and second emission surface 322 as the distance of the light from incidence unit 310 increases.

Plurality of legs 330 are disposed on the back side of light flux controlling member 300, and support light flux controlling member 300 with respect to substrate 210. Number and shape of legs 330 are not limited as long as light flux controlling member 300 can be stably supported. In the present embodiment, light flux controlling member 300 includes four cylindrical legs 330.

In light flux controlling member 300 according to the present embodiment, each leg 330 is disposed at a position that satisfies the following condition 1 or 2 from the viewpoint of reducing the effect on the light distribution characteristics of light flux controlling member 300. Light flux controlling member 300 illustrated in FIG. 5B satisfies condition 1.

Condition 1

When light flux controlling member 300 is viewed in plan view, at least a part of leg 330 is disposed outside a first region. The first region is a region surrounded by 2n straight lines obtained by drawing two straight lines individually at an angle of $\pm(60/n)°$ with respect to center of gravity CP of a polygonal from the center of each of n incidence units 310. The polygonal is formed by connecting the respective centers (central axes CA) of n incident units 310.

Condition 2

Entire leg 330 is disposed inside a second region where light defined by a) to c) below substantially does not reach. The light defined by a) to c) is of the light emitted from the light emitting center and incident on incident surface 311 (the light emitting center is the intersection at the light emitting surface of light emitting element 220 with central axis CA of incidence unit 310). The light defined by a) to c) is as follows: a) light that is reflected by no surface except for reflection surface 312 after reaching reflection surface 312 directly from incidence surface 311 and being reflected by reflection surface 312, b) light that is reflected by no surface except for reflection surface 312 or first emission surface 321 after reaching reflection surface 312 directly from incidence surface 311 and being sequentially reflected by reflection surface 312 and first emission surface 321, and c) light that is reflected by no surface except for first emission surface 321 after reaching first emission surface 321 directly from incidence surface 311 and being reflected by first emission surface 321.

First, condition 1 will be described with reference to the drawings. Condition 1 specifies that leg 330 is not disposed between incidence unit 310 and the central portion of light flux controlling member 300. This is because a dark part is more likely to be generated in the region located on light diffusion plate 120 and directly above the central portion of light flux controlling member 300 when leg 330 is disposed between incidence unit 310 and the central portion of light flux controlling member 300.

Figure 7A:
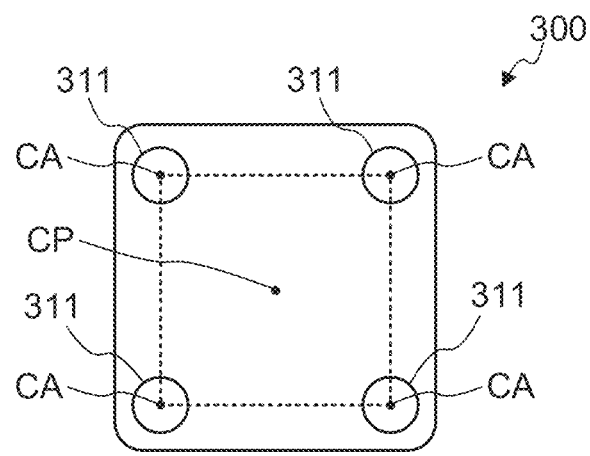
FIGS. 7A to 7C are schematic views for explaining condition 1.

With light flux controlling member 300 in plan view, a polygon and center of gravity CP of the polygon are specified from the polygon formed by connecting the centers (central axes CA) of respective n incident units 310. In the case of light flux controlling member 300 according to the present embodiment, a quadrangle (square) is formed as indicated by the dashed line in FIG. 7A.

Figure 7B:
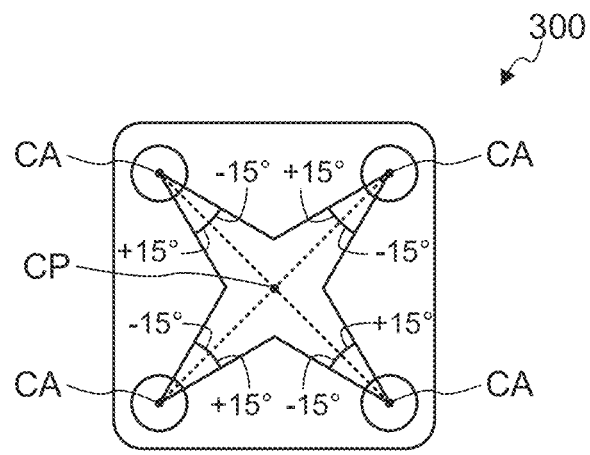

From the center of each of the n incident units 310 (the apex of the polygon), two straight lines are drawn at respective angles of $+(60/n)°$ and $-(60/n)°$ with respect to center of gravity CP of the polygon. As illustrated in FIG. 7B, two straight lines are drawn from the center of each of four incident units 310 (the apex of a quadrangle) in such a way that the respective angles become $+15°$ and $-15°$ with respect to center of gravity CP of the quadrangle, as n=4 in the present embodiment. Each straight line is extended from the center of incidence unit 310 until the straight line intersects with another straight line.

Figure 7C:
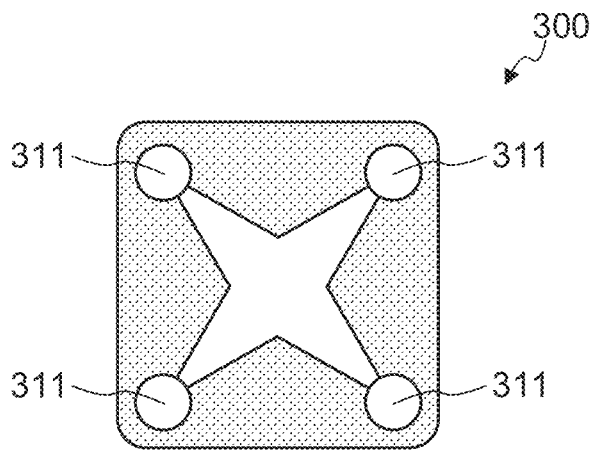

The region surrounded by the drawn 2n straight lines is defined as the first region. Each leg 330 is disposed on the back side of light flux controlling member 300 in such a way that at least a part of the leg is located outside the first region. In the present embodiment, at least a part of leg 330 is disposed in a region (i.e., region with hatching as illustrated in FIG. 7C) which is not the first region or incidence surface 311 in the back side surface of light flux controlling member 300. For each leg 330, the proportion of the portion located outside the first region is preferably 30% or more, more preferably 50% or more, and particularly preferably 100%.

Figure 8A:
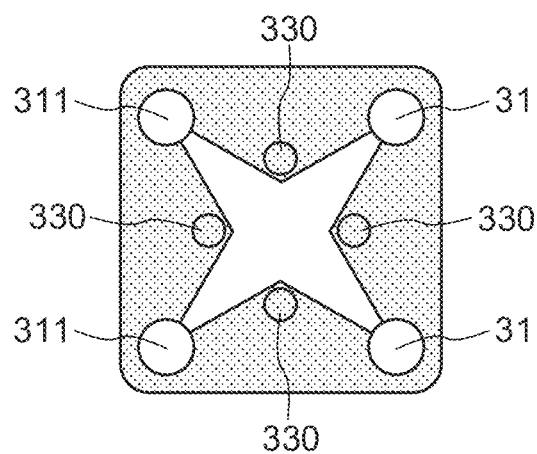
FIGS. 8A to 8D are schematic views for explaining condition 1.
Figure 8B:
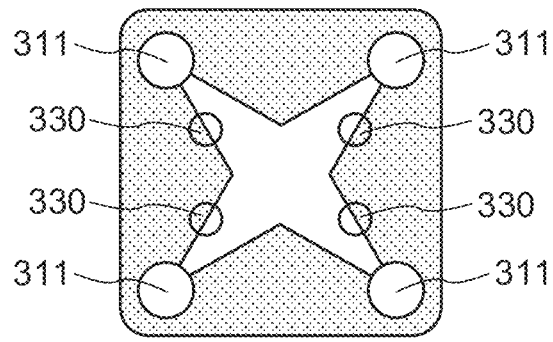
Figure 8C:
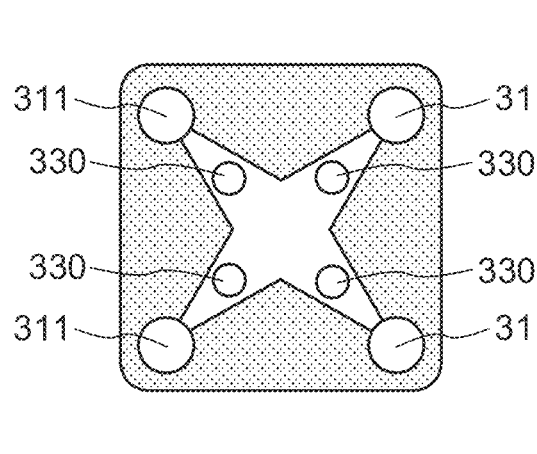
Figure 8D:
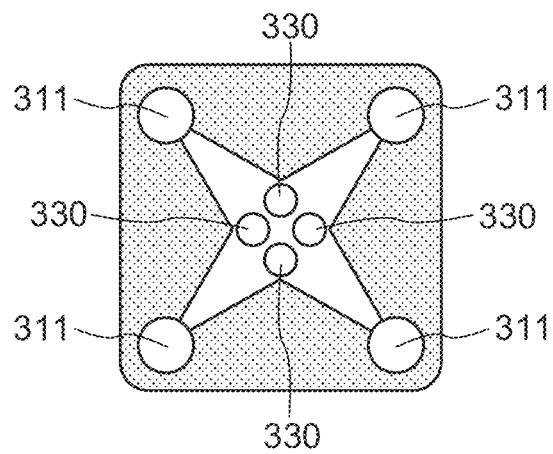

For example, when entire leg 330 is located outside the first region for all legs 330 as illustrated in FIG. 8A, light flux controlling member 300 satisfies condition 1. When a part of leg 330 is located outside the first region for all legs 330 as illustrated in FIG. 8B, light flux controlling member 300 also satisfies condition 1. Light flux controlling member 300 illustrated in FIG. 5B satisfies condition 1 as entire leg 330 is located outside the first region for two legs 330, and a part of leg 330 is located outside the first region for two legs 330. On the other hand, when entire leg 330 is located inside the first region for at least one leg 330 as illustrated in FIGS. 8C and 8D, light flux controlling member 300 does not satisfy condition 1.

Second, condition 2 will be described with reference to the drawings. Condition 2 specifies that legs 330 are disposed on the back side of light flux controlling member 300 in a region, located around incidence unit 310, where the light incident on incidence surface 311 substantially does not reach. This is because disposing legs 330 in a region where the light incident on incidence surface 311 substantially does not reach can reduce the effect on the light distribution characteristics of light flux controlling member 300.

Figure 9:
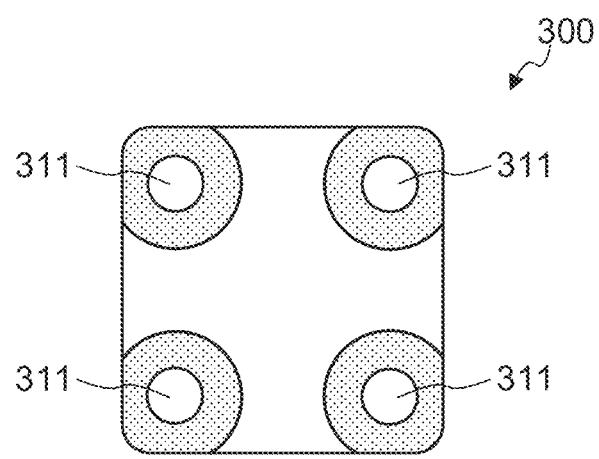
FIG. 9 is a schematic view for explaining condition 2.

As illustrated in FIG. 6, a part of the light emitted from the light emitting center of light emitting element 220 and incident on incidence surface 311 is directly directed to first emission surface 321 of emission unit 320 without being reflected by reflection surface 312. Another part of the light emitted from the light emitting center of light emitting element 220 and incident on incidence surface 311 is reflected by reflection surface 312 and directed toward second emission surface 322 of emission unit 320. Yet another part of the light emitted from the light emitting center of light emitting element 220 and incident on incidence surface 311 is sequentially reflected by reflection surface 312 and first emission surface 321 of emission unit 320 and directed toward second emission surface 322 of emission unit 320. Light directed from reflection surface 312 or first emission surface 321 toward second emission surface 322 reaches second emission surface 322 at a position with a certain distance from incidence surface 311. As indicated by reference numeral A in FIG. 6, there is thus a second region on the back side of light flux controlling member 300, more specifically, around incidence surface 311—the light incident on incidence surface 311 substantially does not reach the second region. Herein, it is assumed that all the light emitted from the light emitting center of light emitting element 220 passes through incidence surface 311 and all the light reaching reflection surface 312 is totally reflected by reflection surface 312. Light arriving from distant incidence unit 310 through emission unit 320 is not included in the assumption. In the present embodiment, entire leg 330 may be disposed in the second region, namely the hatched region as illustrated in FIG. 9, of the back side surface of light flux controlling member 300.

Figure 10A:
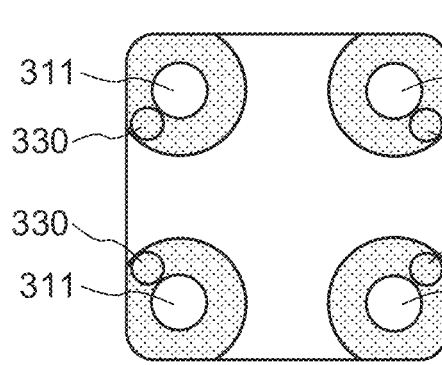
FIGS. 10A to 10D are schematic views for explaining condition 2.
Figure 10B:
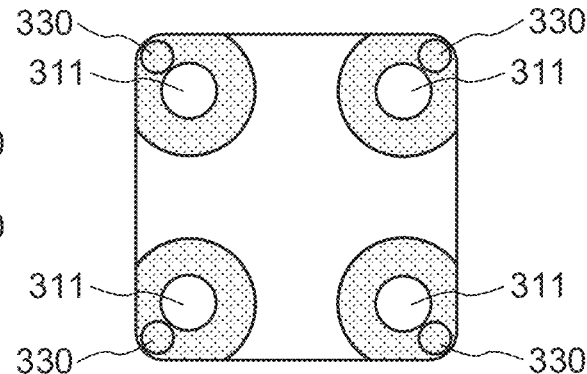
Figure 10C:
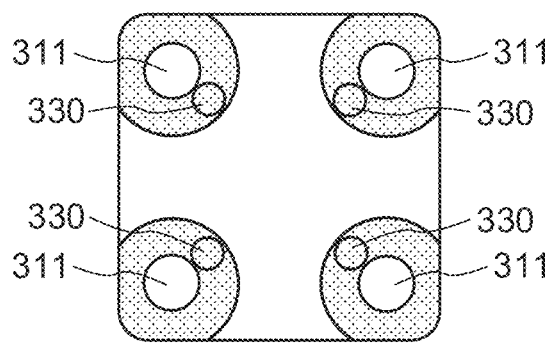
Figure 10D:
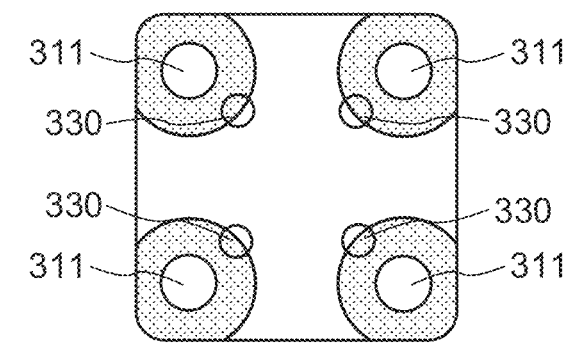

For example, when entire leg 330 is located inside the second region for all legs 330 as illustrated in FIGS. 10A to 10C, light flux controlling member 300 satisfies condition 2. In the example shown in FIG. 10C, condition 1 may not be satisfied, but condition 2 is satisfied. On the other hand, when at least a part of leg 330 is located outside the second region for at least one leg 330 as illustrated in FIG. 10D, light flux controlling member 300 does not satisfy condition 2.

Figure 11A:
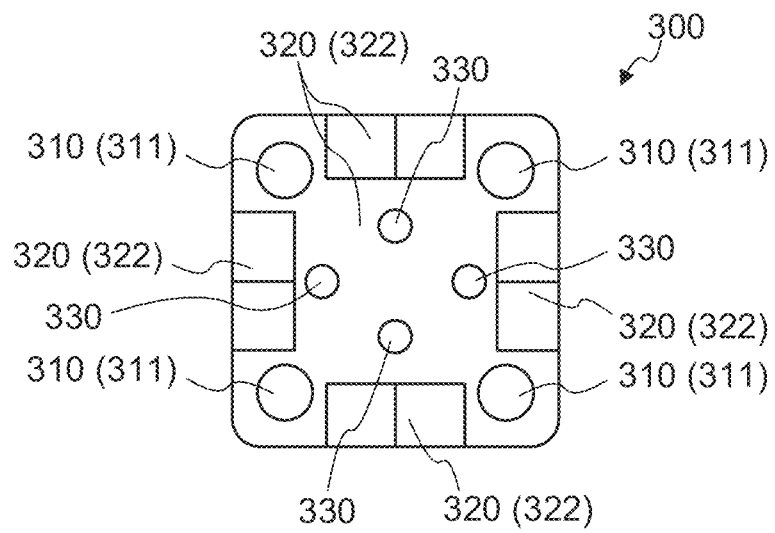
FIGS. 11A and 11B are bottom views of light flux controlling members according to the embodiment.
Figure 11B:
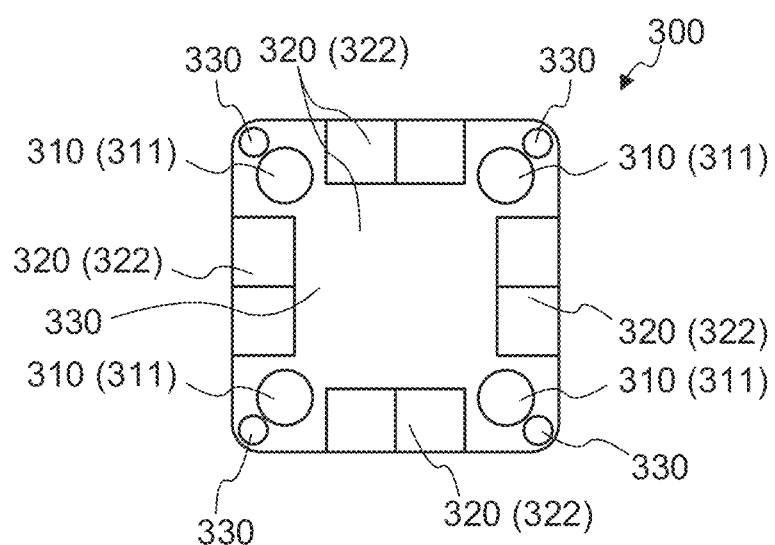
Figure 12A:
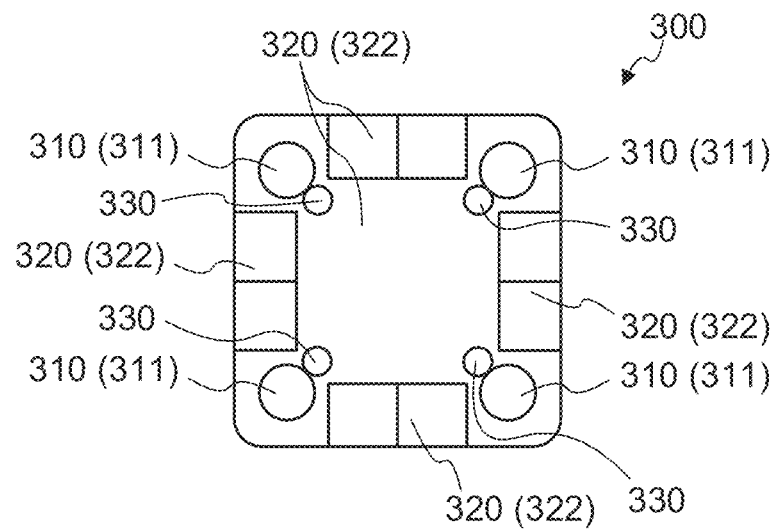
FIG. 12A is a bottom view of a light flux controlling member according to the embodiment.
Figure 12B:
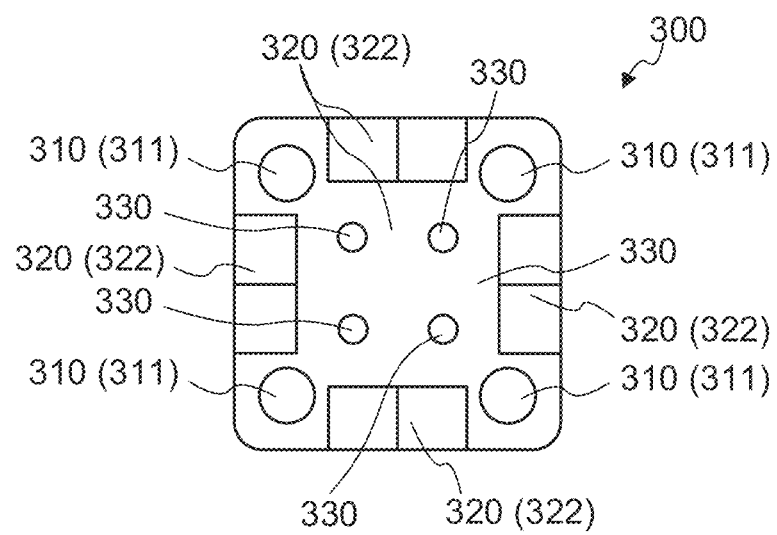
FIG. 12B is a bottom view of a comparative light flux controlling member.

FIG. 11A is a bottom view of light flux controlling member 300 satisfying the above condition 1, according to the embodiment (the same figure as FIG. 5B). FIG. 11B is a bottom view of light flux controlling member 300 satisfying the above conditions 1 and 2, according to a modification of the embodiment. FIG. 12A is a bottom view of light flux controlling member 300 satisfying the above condition 2, according to a modification of the embodiment. FIG. 12B is a bottom view of a comparative light flux controlling member that does not satisfy either of the above conditions 1 and 2. The light flux controlling members illustrated in these drawings have the same configuration except for the thickness and position of legs 330.

Figure 13A:
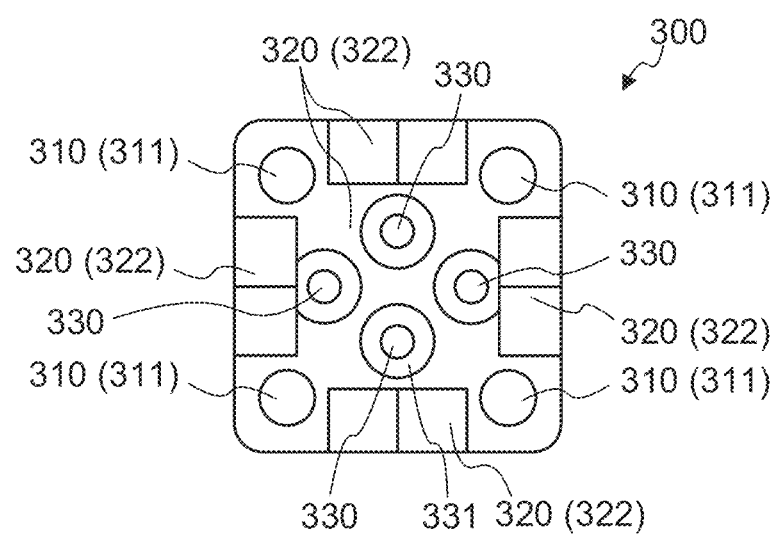
FIGS. 13A and 13B illustrate a configuration of a light flux controlling member according to a modification of the embodiment.
Figure 13B:
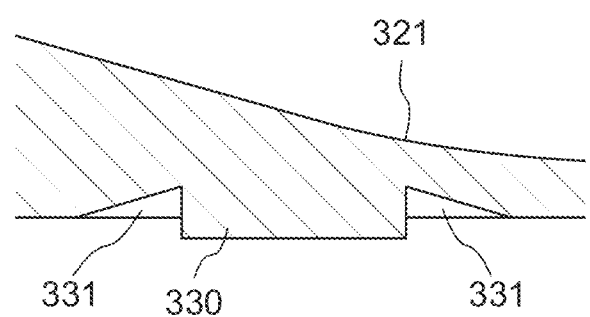

Each leg 330 is disposed so as to protrude from the back surface of light flux controlling member 300, but recess 331 (groove) may be formed around each leg 330 on the back surface so as to surround leg 330. That is, light flux controlling member 300 may include recess 331 that surrounds the base end of leg 330. FIG. 13A is a bottom view of light flux controlling member 300, which includes such recess 331, according to a modification of the embodiment. FIG. 13B is a partially enlarged cross-sectional view of the periphery of leg 330. Providing recess 331 so as to surround leg 330 as described above can reduce the effect of an adhesive on the light distribution characteristics of light flux controlling member 300 when leg 330 of light flux controlling member 300 is fixed to substrate 210 by using the adhesive. This effect is also obtained when plurality of legs 330 do not satisfy the above condition 1 and/or condition 2.

Recess 331 may have any shape, but the shape is preferably set according to the luminance distribution of light emitting device 200. For example, the cross-sectional shape of recess 331 along the thickness direction of light flux controlling member 300 is a triangle or a rectangle. Recess 331 may also be at any position that surrounds the base end of leg 330, but the position is preferably close to the base end of leg 330. It is preferable that the side surface of leg 330 and the inner surface of recess 331 are continuous. For example, plurality of legs 330 are fixed to substrate 210 by pouring an adhesive into recesses 331 having a shape set according to the luminance distribution of light emitting device 200.

The outer edge of light flux controlling member 300 on the front side may be chamfered such as round chamfered or chamfered (inclined surface). By chamfering the front side outer edge of light flux controlling member 300, a region of light diffusion plate 120 located between light emitting devices 200 can be irradiated with a large amount of light, thereby preventing the region located between light emitting devices 200 from becoming dark.

Simulation of Illuminance Distribution

The simulation result of the illuminance distribution of surface light source device 100 including light flux controlling member 300 is shown to indicate the effect of the positions of legs 330 on the light distribution characteristics of light flux controlling member 300. The result shows the illuminance distribution on light diffusion plate 120 when only the four light emitting elements 220 included in one light emitting device 200 are turned on in surface light source device 100.

Figure 14A:
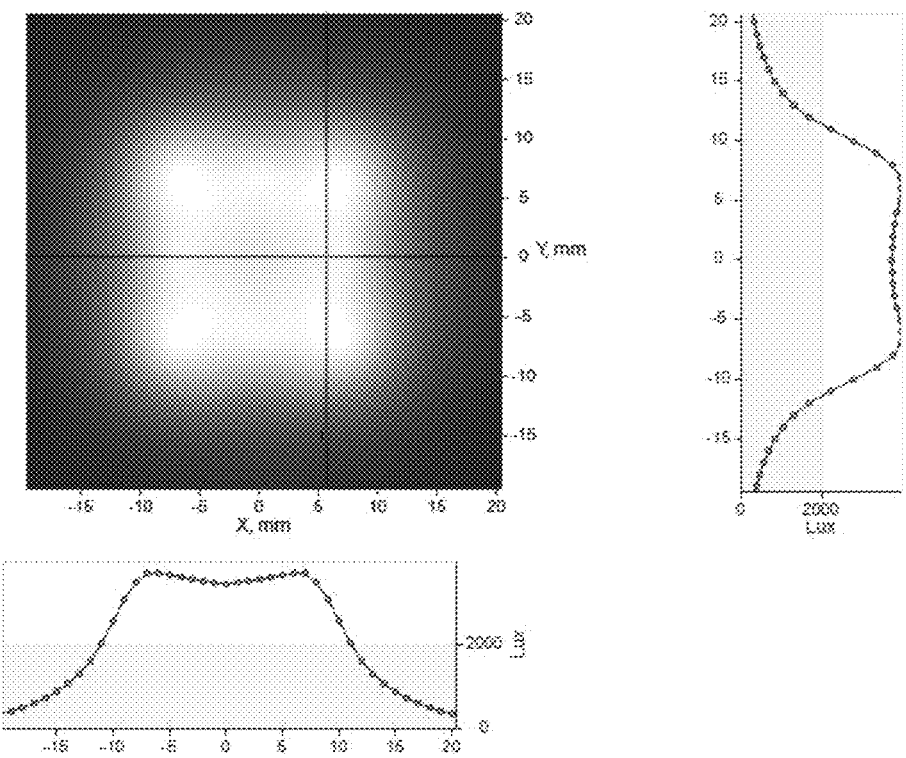
FIG. 14A shows the illuminance distribution of a surface light source device including a comparative light flux control member without legs.

FIG. 14A shows the illuminance distribution in the case of using a light flux controlling member with no legs 330 for comparison. This light flux controlling member has the same configuration as light flux controlling members 300 illustrated in FIGS. 4 and 5A to 5C except that this light flux controlling member include no legs 330. In FIG. 14A, the lower graph shows the illuminance distribution in the lateral direction between two upper light emitting elements 220 and two lower light emitting elements 220, and the right graph shows the illuminance distribution in the vertical direction passing through the light emitting centers of two right light emitting elements 220 (the same applies to the subsequent simulation results).

The results of FIG. 14A show that appropriately configuring incidence unit 310 and emission unit 320 as in light flux controlling member 300 according to the present embodiment can appropriately expand light emitted from each light emitting element 220 to illuminate a predetermined region substantially uniformly.

Figure 14B:
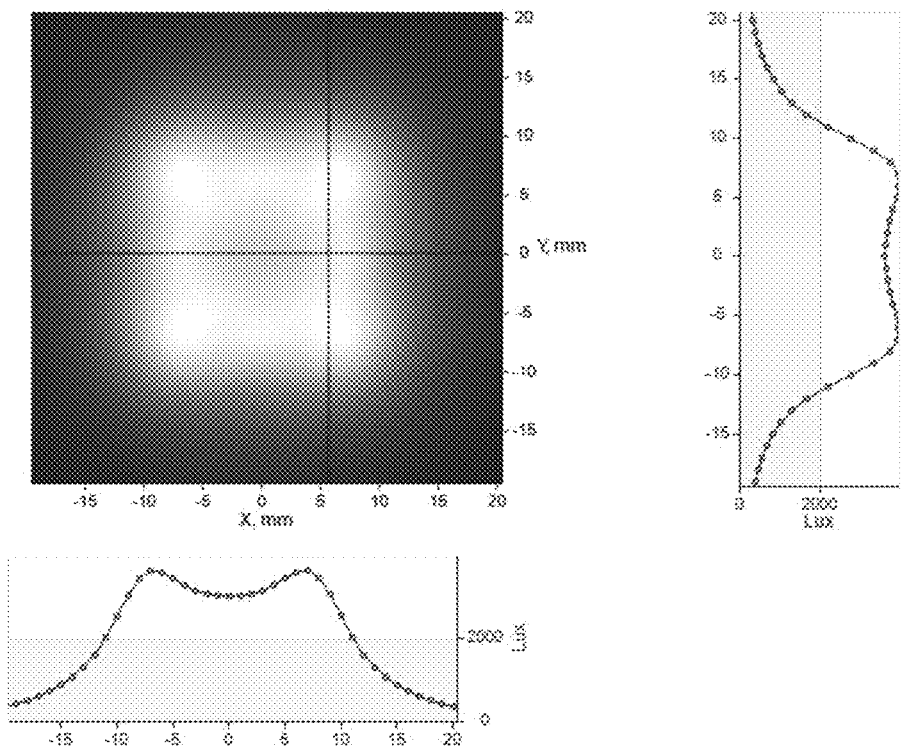
FIG. 14B shows the illuminance distribution of a surface light source device including the comparative light flux control member illustrated in FIG. 12B.

FIG. 14B shows the illuminance distribution in the case of using a light flux controlling member, in which plurality of legs 330 are disposed at positions that do not satisfy either of the above conditions 1 and 2, as illustrated in FIG. 12B. This light flux controlling member has the same configuration as light flux controlling members 300 illustrated in FIGS. 4 and 5A to 5C except that the thickness and the position of plurality of legs 330 are different from those of light flux controlling members 300.

The results of FIG. 14B show that when plurality of legs 330 are disposed at positions that do not satisfy either of the above conditions 1 and 2, the original light distribution characteristics of the light flux controlling member cannot be exhibited, and a dark part is generated directly above the center of the light flux controlling member.

Figure 15A:
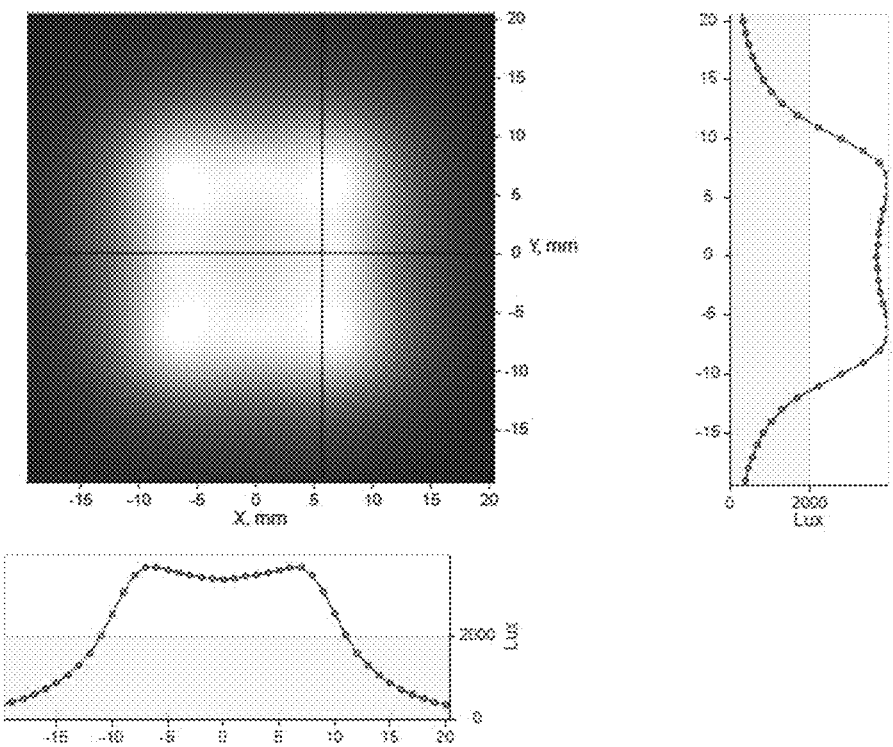
FIGS. 15A and 15B show the illuminance distribution of surface light source devices each including a light flux controlling member according to the embodiment.
Figure 15B:
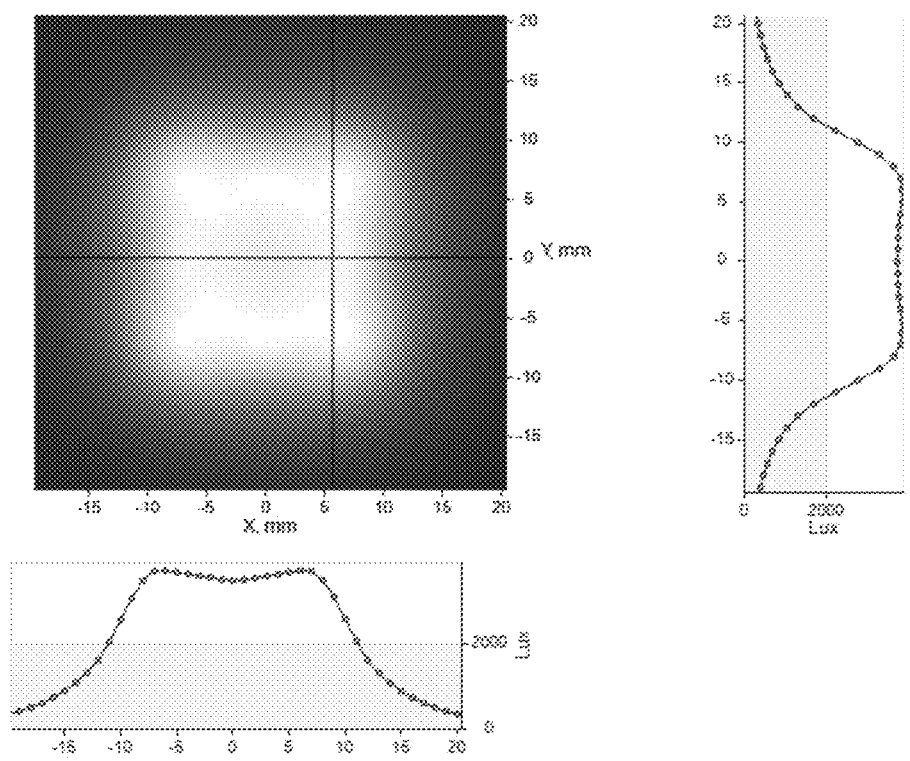
Figure 16:
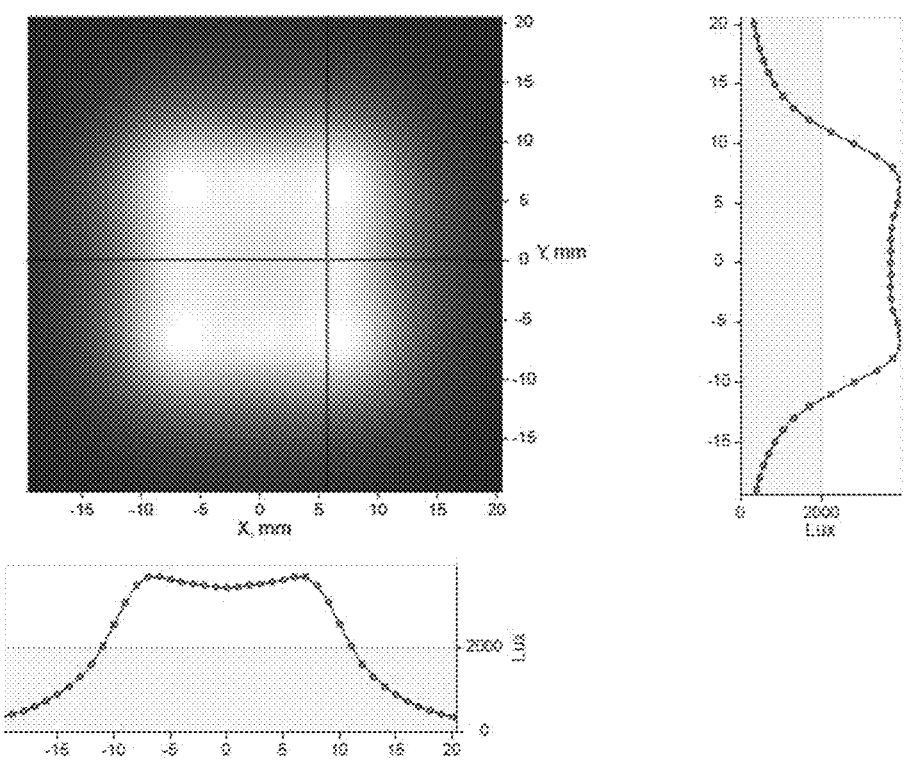
FIG. 16 shows the illuminance distribution of a surface light source device including a light flux controlling member according to the embodiment.

FIG. 15A shows the illuminance distribution in the case of using light flux controlling member 300, in which plurality of legs 330 are disposed at the positions satisfying the above condition 1, according to the present embodiment as illustrated in FIG. 11A (FIG. 5B). FIG. 15B shows the illuminance distribution in the case of using light flux controlling member 300, in which plurality of legs 330 are disposed at the positions satisfying the above conditions 1 and 2, according to the modification of the present embodiment as illustrated in FIG. 11B. FIG. 16 shows the illuminance distribution in the case of using light flux controlling member 300, in which plurality of legs 330 are disposed at the positions satisfying the above condition 2, according to the modification of the present embodiment as illustrated in FIG. 12A. These light flux controlling members have the same configuration as light flux controlling members 300 illustrated in FIGS. 4 and 5A to 5C except that the thickness and the position of plurality of legs 330 are different from those of light flux controlling member 300.

The results of FIGS. 15A to 16 show that when plurality of legs 330 are disposed at positions satisfying the above condition 1 or 2, the original light distribution characteristics of the light flux controlling member can be maintained even when plurality of legs 330 are provided.

The above results show that light flux controlling members 300 according to the present embodiment can expand light emitted from each light emitting element 220 to substantially uniformly illuminate a region corresponding to light emitting element 220.

Effects

Light flux controlling member 300 of the present embodiment can expand light from each light emitting element 220 within an appropriate range while minimizing the excessive expansion of the light even when the distance between substrate 210 and light diffusion plate 120 is small Therefore, the present invention is effective for local dimming. In addition, the present invention allows one light flux controlling member 300 to control light from plurality of light emitting elements 220, thereby facilitating the mounting of light flux controlling member 300.

Modification

The above embodiment describes light flux controlling member 300 including four incidence units 310 disposed above corresponding four light emitting elements 220, but the light flux controlling member according to the present invention is not limited thereto. The light flux controlling member according to the present invention may have any configuration that can be used for plurality of light emitting elements 220.

Figure 17A:
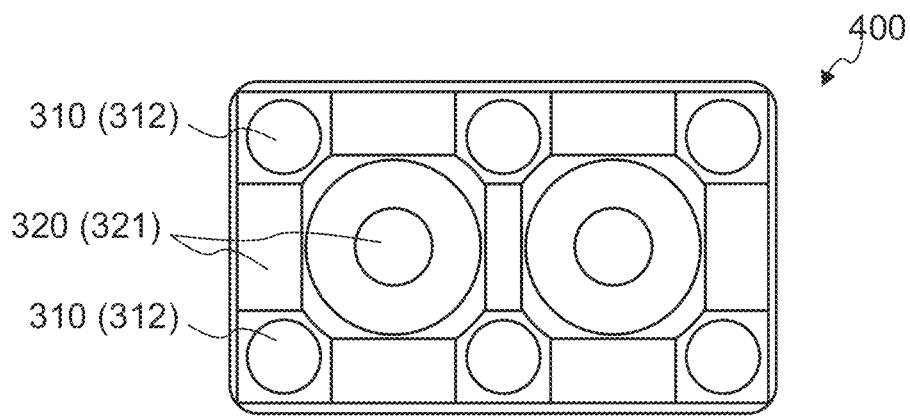
FIGS. 17A to 17C illustrate a configuration of a light flux controlling member according to a modification of the embodiment.
Figure 17B:
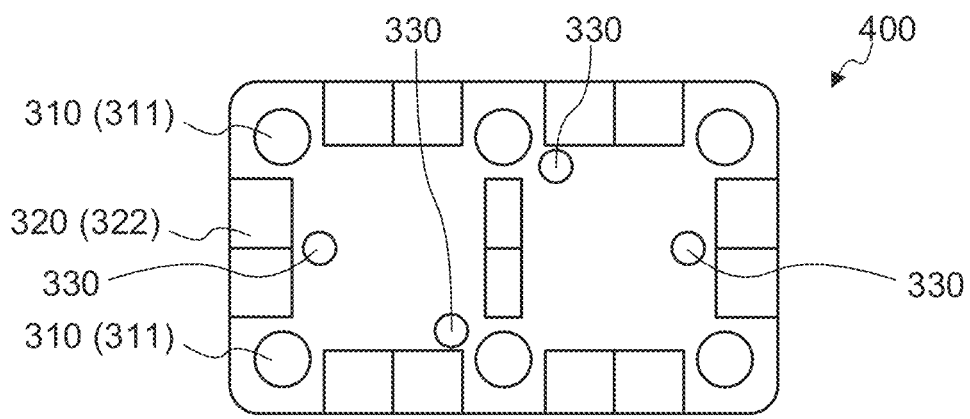
Figure 17C:
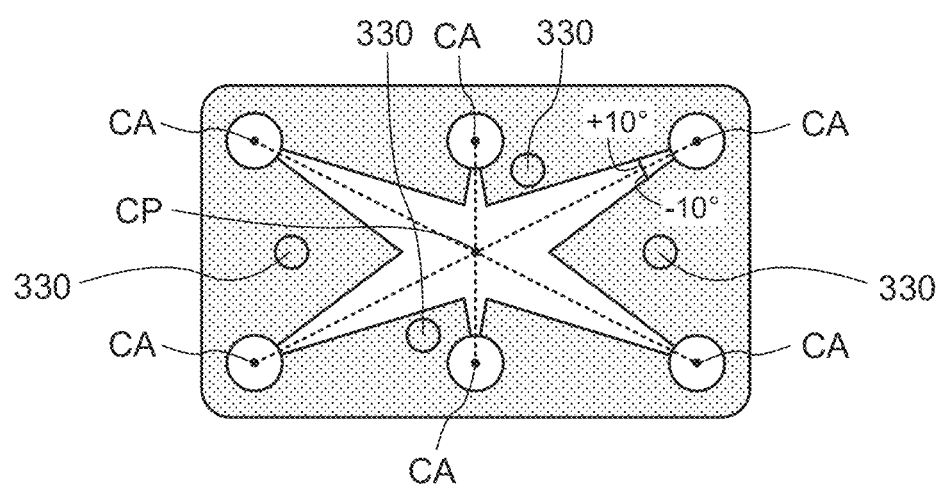

FIGS. 17A and 17B are a plan view and a bottom view of light flux controlling member 400 including six incidence units 310 disposed above corresponding six light emitting elements 220. Light flux controlling member 400 includes incidence units 310 whose number corresponds to the number of light emitting elements 220, one or more emission units 320, and plurality of legs 330, in the same manner as in light flux controlling member 300. Plurality of legs 330 are disposed at positions satisfying the above condition 1 or 2. As illustrated in FIG. 17C, plurality of legs 330 are disposed at positions satisfying the above condition 1 in the example of FIG. 17B.

Effects

Light flux controlling member 400 according to the present modification has the same effects as light flux controlling member 100 according to the above embodiment.

INDUSTRIAL APPLICABILITY

The light flux controlling member, the light emitting device and the surface light source device according to the present invention may be applied to, for example, a backlight of a liquid crystal display device and general-purpose lighting.

REFERENCE SIGNS LIST

100 Surface light source device
100' Display device
102 Display member
110 Casing
112 Bottom plate
114 Top plate
120 Light diffusion plate
200 Light emitting device
210 Substrate
220 Light emitting element
300, 400 Light flux controlling member
310 Incidence unit
311 Incidence surface
312 Reflection surface
320 Emission unit
321 First emission surface
322 Second emission surface
330 Leg
331 Recess
A Region where light does not reach
CA Central axis
CP Center of gravity of n-sided polygon
OA Optical axis

The invention claimed is:

1. A light emitting device, comprising:
n light emitting elements disposed on a substrate; and
a light flux controlling member for controlling a distribution of light emitted from the n light emitting elements, the light flux controlling member being disposed above the n light emitting elements,
wherein the light flux controlling member comprises:
n incidence units for allowing incidence of the light emitted from the n light emitting elements, respectively;
an emission unit disposed between the n incidence units in a direction along the substrate, the emission unit allowing emission of the light incident on the n incidence units while guiding the light; and
a plurality of legs disposed on a back side of the light flux controlling member, the plurality of legs supporting the light flux controlling member with respect to the substrate;
wherein each of the n incidence units includes:
an incidence surface disposed on the back side of the light flux controlling member, the incidence surface allowing incidence of the light emitted from the light emitting element, and
a reflection surface disposed at a position on a front side of the light flux controlling member, the position facing the light emitting element with the incidence surface interposed between the reflection surface and the light emitting element, the reflection surface reflecting, in a lateral direction, the light incident on the incidence surface in such a way that the reflected light travels away from an optical axis of the light emitting element,
wherein the emission unit includes:
a first emission surface disposed on the front side of the light flux controlling member, the first emission surface being a concave surface, the first emission surface reflecting a first part of the light from the incidence unit and emitting a second part of the light from the incidence unit, and
a second emission surface disposed on the back side of the light flux controlling member so as to face away from the first emission surface, the second emission surface reflecting a third part of the light from the incidence unit and emitting a fourth part of the light from the incidence unit,
wherein a distance between the first emission surface and the second emission surface decreases as a distance of the first emission surface and the second emission surface from the incidence unit increases, and
wherein each of the plurality of legs is disposed at a position satisfying condition 1, wherein the condition 1 includes:
with the light flux controlling member in plan view, at least a part of the leg is disposed outside a first region surrounded by 2n straight lines obtained by drawing two straight lines from a center of each of the n incidence units, the two straight lines being at respective angles of $+(60/n°)$ and $-(60/n°)$ with respect to a center of gravity of a polygonal formed by connecting the respective centers of the n incident units.

2. The light emitting device according to claim 1, wherein the n incidence units are four incidence units disposed at positions corresponding to respective vertices of a rectangle with the light flux controlling member in plan view.

3. A surface light source device, comprising:
a plurality of the light emitting devices according to claim 1; and
a light diffusion plate that transmits light emitted from the plurality of light emitting devices while diffusing the light.

4. A display device comprising:
the surface light source device according to claim 3, and
a display member to be illuminated with light emitted from the surface light source device.

5. A method for improving luminance unevenness of the light emitting device according to claim 1, wherein:
the plurality of legs of the light flux controlling member are fixed to the substrate by using an adhesive having an optical absorption rate selected according to a luminance distribution.

* * * * *